United States Patent

[11] 3,598,277

| [72] | Inventor | John W. Adelman<br>Chicago, Ill. |
|---|---|---|
| [21] | Appl. No. | 874,425 |
| [22] | Filed | Nov. 6, 1969 |
| [45] | Patented | Aug. 10, 1971 |
| [73] | Assignee | Union Tank Car Company |

[54] SAFETY VENT DISCHARGE ARRANGEMENT
2 Claims, 3 Drawing Figs.

[52] U.S. Cl. .................................................. 220/44 R, 220/89 A
[51] Int. Cl. .................................................. B65d 51/16
[50] Field of Search .......................................... 220/89 A, 44; 137/68—73, 533.17—533.31

[56] References Cited
UNITED STATES PATENTS

| 1,697,199 | 1/1929 | McKenzie-Martyn | 220/89 A |
| 2,077,725 | 4/1937 | Tyler | 239/506 X |
| 2,316,480 | 4/1943 | White et al. | 137/533.23 X |
| 3,001,537 | 9/1961 | Shepherd et al. | 137/533.29 X |
| 3,310,197 | 3/1967 | Folmsbee et al. | 220/89 A |
| 3,356,249 | 12/1967 | Koester | 220/44 A |
| 3,520,443 | 7/1970 | Selby, Jr. | 220/89 A |

*Primary Examiner*—M. Henson Wood, Jr.
*Assistant Examiner*—John J. Love
*Attorney*—Charles M. Kaplan ABSTRACT: A safety vent structure for pressure vessels. A body defines a chamber having first and second openings, the latter communicating with an opening in the vessel. Associated with the first opening is a seat member adapted to receive a frangible element in closing relationship to the first opening. A retainer ring, secured to the seat member, serves to hold the frangible element against the seat. A closure cap is supported exteriorly of the retainer ring by a horizontal pin passing through apertures in the retainer ring and vertical slots in the closure cap. The closure cap rises when the escaping commodity makes contact therewith and permits flow to atmosphere. When the pressure within the chamber is reduced to approximately atmospheric pressure, the closure cap will automatically lower itself and close off the opening in the vessel.

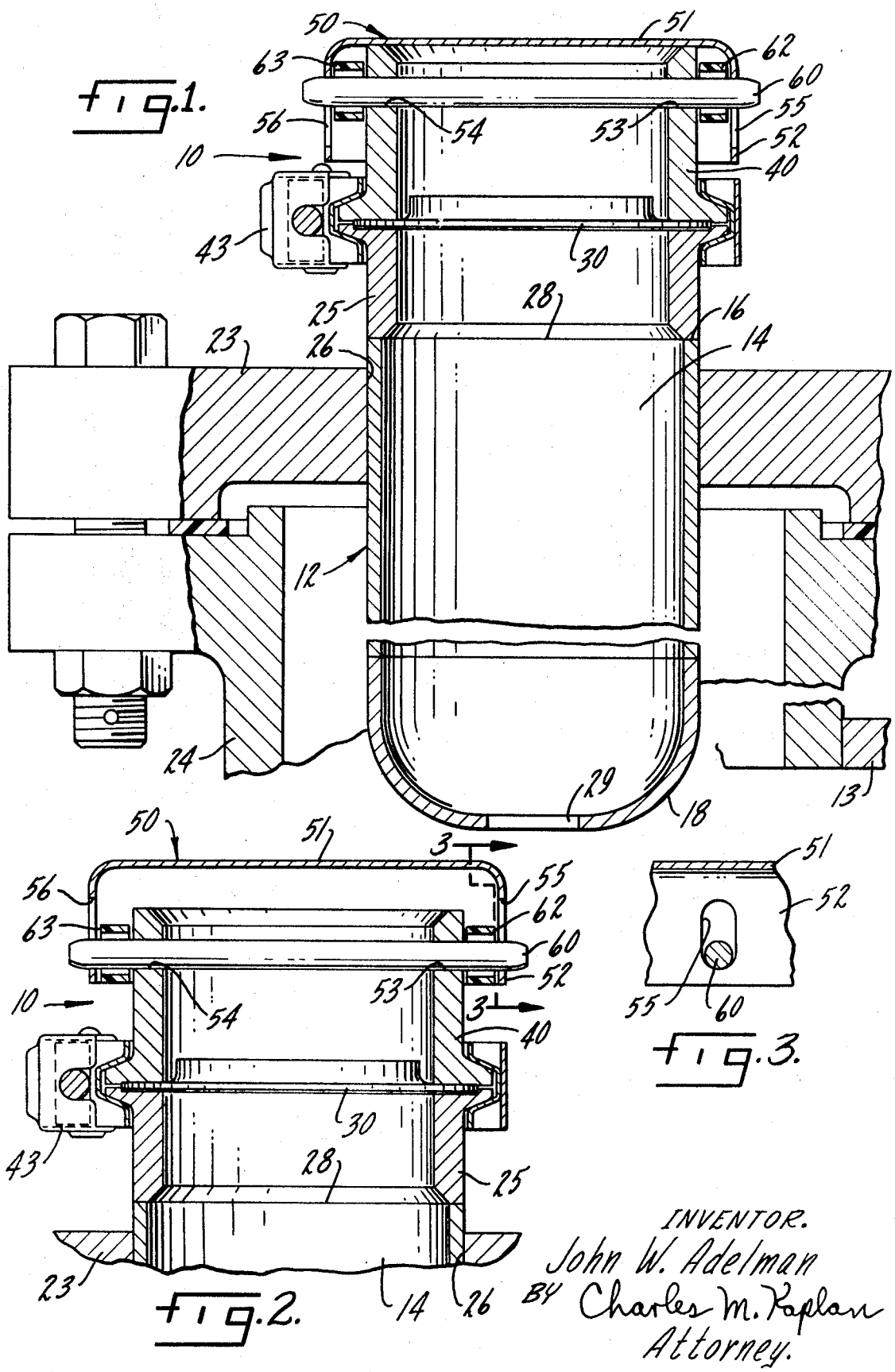

3,598,277

SAFETY VENT DISCHARGE ARRANGEMENT

BACKGROUND OF THE INVENTION

This invention relates generally to pressure relief devices, and more particularly to a new and improved safety vent structure for a pressure vessel that automatically vents the vessel to to atmosphere when a maximum permissible pressure level is reached within the vessel thus preventing damage or failure. Although the invention will be described in the environmental context of a railway tank car, it should be understood that it may be advantageously employed in connection with many other types of fluid storage or transport vessels.

A fluid being transported in a railway tank car, as for example a volatile liquid, may under certain conditions create a pressure within the tank that exceeds a maximum permissible level dictated by the design characteristics of the tank and the materials from which it is formed. Accordingly, it has long been the practice to provide safety vents which automatically vent the tank to atmosphere when this maximum permissible pressure level is reached, thus preventing tank damage or failure. One common type of safety vent designed for this purpose has involved the use of a frangible element, such as a thin lead disc, one side of which is in fluid communication with the interior of the tank and the other side of which is in fluid communication with the atmosphere. Thus, when the pressure within the tank reaches the maximum permissible level, the frangible element ruptures, allowing fluid within the tank to discharge to atmosphere and thus reducing the pressure within the tank. An example of such a safety vent is illustrated in U.S. Pat. No. 3,310,197 to Folmsbee et al.

Such devices, however, have not been found to be entirely satisfactory, inasmuch as after discharge is completed, the tank being open to the atmosphere, permits insects and foreign matter to enter the tank and contaminate the contained commodity and further allows the commodity to splash out of the tank. Attempts to solve this problem have heretofore resulted in complex apparatus of high cost and subject to malfunction. Since a safety vent goes into operation only during emergency conditions, dependability is of utmost importance.

SUMMARY OF THE INVENTION

The general purpose of this invention is to provide a safety vent structure that has all the advantages of similarly employed prior art devices and has none of the above-described disadvantages. To attain this, the present invention provides a chamber in fluid communication with a pressure vessel. A frangible element prevents communication of the interior of the vessel with the atmosphere until the pressure within the vessel increases beyond the rupture limits of the frangible element. A closure cap, positioned above the frangible element, rises when the escaping commodity makes contact therewith and permits flow to atmosphere. When the pressure within the chamber is reduced to approximately atmospheric pressure, the closure cap will automatically lower itself and close off the opening in the vessel. The rising of the closure cap is controlled by a fixed horizontal pin passing through vertical slots within the leg portion of the closure cap.

Accordingly, it is an object of this invention to provide an improved safety vent apparatus for venting a vessel to atmosphere when a maximum permissible pressure level is reached.

Another object is to provide an improved safety vent apparatus for venting a vessel to atmosphere when a maximum permissible pressure level is reached which, at all times, automatically precludes the entry of foreign matter into the vessel.

A further object is to provide an improved safety vent apparatus for a pressure vessel including a frangible element which automatically precludes the entrance of foreign matter into the vessel after rupture of the frangible element that is reliable in operation and inexpensive to manufacture.

Other objects and advantages of the invention will be apparent from the drawing, specification, and claims.

DESCRIPTION OF THE DRAWING

The foregoing objects and features of the invention will be more fully appreciated in light of the following detailed description, with illustrative reference to the drawings, in which:

FIG. 1 is a sectional elevation of an exemplary safety vent structure constructed in accordance with the invention, with the closure cap in a closed position, and associated with a portion of a tank car;

FIG. 2 is a partial sectional elevation of the exemplary safety vent structure showing the closure cap in an open position; and FIG. 3 is a sectional elevation taken on the line 3–3 of FIG. 2.

DESCRIPTION OF THE PREFERRED EMBODIMENT

Referring to FIG. 1, there is illustrated an exemplary safety vent structure 10 constructed in accordance with the present invention. The safety vent structure 10 includes an elongated cylindrical body 12 defining an interior chamber 14. The body includes first and second end portions 16 and 18, respectively. The body 12 is mounted on a cover 23 on a nozzle 24 attached to a railway tank car 13. The body 12 extends through an opening 26 in the cover 23, so that the second end portion 18 is positioned within the confines of the nozzle 24, or the tank car itself. It should be understood, however, that the body 12 could be mounted in association with other structures, such as domes or manways, or could be mounted directly in association with a portion of the main tank wall. Moreover, the safety vent structure 10 could be used in connection with any type of vessel, and is not intended to be limited to the environmental context of a railway tank car. The body 12, although depicted as cylindrical, could actually be of any convenient shape or configuration, provided that it serves to define a chamber 14 having first and second openings 28 and 29 respectively.

The upper end portion 16 of body 12 has associated therewith an annular seat member 25 which provides a seating surface for a frangible element or disc 30. As can be seen, the frangible element 30 is positioned in closing relationship to the first opening 28 leading into chamber 14. Mounted atop the frangible element 30 is a retainer ring 40 which serves to retain the frangible element securely in place against the seat member 25.

Seat member 25 is releasably secured to retainer ring 40 by a coupling clamp 43 as disclosed in copending application Ser. No. 734,489, assigned to the assignee of the present application. It should be understood, however, that seat member 25 could be secured to retainer ring 40 in any conventional manner, i.e. by nuts and bolts.

Closure cap 50, of generally inverted U-shaped diametrical cross section, is disposed exteriorly of retainer ring 40. Closure cap 50 has a circular base portion 51 and a leg portion 52 extending around the entire circumference of portion 51. Closure cap 50 is secured to retainer ring 40 by laterally projecting means, such as horizontal pin 60, passing through apertures 53 and 54 in retainer ring 40 and through apertures 55 and 56 in leg portion 52 of closure cap 50. Apertures 53 and 54 are of substantially the same diameter as horizontal pin 60. Apertures 55 and 56 define a pair of vertically elongated slots having a width of approximately the diameter of horizontal pin 60 thereby allowing closure cap 50 to slide upwardly with respect to pin 60 and retainer ring 40. FIGURE 3 illustrates pin 60 within elongated slot 55 when closure cap 50 is in its upper position.

Bushings 62 and 63 are provided circumferentially around pin 60 to space leg portion 52 from retainer ring 40. This assures adequate fluid communication between chamber 14 and the atmosphere after rupture of frangible element 30.

As seen in FIG. 1, base portion 51 of closure cap 50 rests upon the upper edges of retainer ring 40 and thereby prevents foreign matter from entering chamber 14. If the pressure within chamber 14 increases beyond the rupture limits of frangible element 30, the frangible element will rupture and allow the contained commodity to flow past the frangible element. When the commodity makes contact with the closure cap 50, the closure cap will rise to allow flow to atmosphere, as seen in FIG. 2. The rise of the closure cap 50 is controlled by the length of slots 55 and 56 and the diameter of pin 60.

When the pressure within chamber 14 is reduced to approximately 0.2 p.s.i.g., the closure cap 50 will automatically lower itself and return to the closed position of FIG. 1. With the closure cap 50 in the closed position, insects and foreign matter are not allowed admittance into the tank due to the closing of retainer ring 40 by base portion 51 of closure cap 50. When the closure cap 50 is in the raised position insects and foreign matter cannot enter the tank due to the flow of liquid to the atmosphere.

A safety vent structure constructed in accordance with the present invention may be readily installed in existing tank cars and other fluid storage or transport units. As will be apparent to those familiar with the art, the subject safety vent structure is simple and can be inexpensively constructed and operated with little change of malfunction.

Although an embodiment constructed in accordance with the present invention has been described with the requisite particularly, the disclosure is, of course, only exemplary. Consequently, numerous changes in details of construction, in size, configuration and arrangement of components and materials and in modes of application will be apparent to those familiar with the art and may be resorted to without departing from the scope of the invention as set forth in the following claims.

I claim:
1. A safety vent structure for a railway tank car comprising:
   a. a body defining a chamber having first and second end portions respectively defining first and second openings into said chamber;
   b. said body being mounted in association with said tank so that said second opening permits fluid communication between said chamber and the interior of said tank;
   c. an annular seat associated with said first end portion adjacent said first opening;
   d. a frangible element mounted on said seat in closing relationship to said first opening;
   e. a retainer ring fastened to said annular seat for holding said frangible element in fluidtight association with said first opening;
   f. a closure cap of generally inverted U-shaped diametrical cross section disposed exteriorly of said retainer ring, said closure cap having a base in closing relationship to said retainer ring and leg portion overlapping and spaced from said retainer ring; and
   g. substantially horizontal pin means extending through a pair of apertures in said retainer ring and through a pair of vertically elongated slots in said leg portion of said closure cap so as to permit movement of said closure cap away from said retainer ring upon an increase in pressure in said chamber beyond the rupture limits of said frangible element and return of said closure cap to a closing relationship with said retainer ring after reduction of said chamber pressure.

2. A safety vent structure as defined in claim 1, wherein a pair of bushing means are provided circumferentially around said horizontal pin means between said closure cap and said retainer ring.